(12) United States Patent
Martin et al.

(10) Patent No.: US 7,181,488 B2
(45) Date of Patent: Feb. 20, 2007

(54) SYSTEM, METHOD AND COMPUTER PROGRAM PRODUCT FOR PRESENTING INFORMATION TO A USER UTILIZING HISTORICAL INFORMATION ABOUT THE USER

(75) Inventors: Anthony G. Martin, Los Altos, CA (US); Eugene Veteska, San Jose, CA (US)

(73) Assignee: Claria Corporation, Redwood City, CA (US)

( * ) Notice: Subject to any disclaimer, the term of this patent is extended or adjusted under 35 U.S.C. 154(b) by 551 days.

(21) Appl. No.: 10/057,413

(22) Filed: Jan. 25, 2002

(65) Prior Publication Data

US 2003/0005134 A1    Jan. 2, 2003

Related U.S. Application Data

(60) Provisional application No. 60/301,888, filed on Jun. 29, 2001, provisional application No. 60/347,921, filed on Oct. 18, 2001.

(51) Int. Cl.
*G06F 15/16* (2006.01)

(52) U.S. Cl. .................. 709/200; 709/219; 705/52

(58) Field of Classification Search .............. 709/200, 709/203, 217, 224, 231, 232, 202, 227, 219; 705/1, 76, 8, 10, 14, 27, 52; 707/2, 3, 100; 463/42; 717/174

See application file for complete search history.

(56) References Cited

U.S. PATENT DOCUMENTS

| | | | |
|---|---|---|---|
| 5,446,919 A | | 8/1995 | Wilkins |
| 5,617,526 A | | 4/1997 | Oran et al. |
| 5,675,510 A | | 10/1997 | Coffey et al. |
| 5,796,952 A | | 8/1998 | Davis et al. |
| 5,848,396 A | | 12/1998 | Gerace |
| 5,872,850 A | * | 2/1999 | Klein et al. .................. 705/51 |
| 5,901,287 A | * | 5/1999 | Bull et al. .................. 709/218 |
| 5,991,735 A | | 11/1999 | Gerace |
| 6,006,252 A | | 12/1999 | Wolfe |
| 6,009,410 A | * | 12/1999 | LeMole et al. .............. 705/14 |
| 6,026,368 A | | 2/2000 | Brown et al. |
| 6,029,141 A | * | 2/2000 | Bezos et al. ................ 705/27 |
| 6,029,195 A | * | 2/2000 | Herz .......................... 725/116 |
| 6,047,327 A | * | 4/2000 | Tso et al. .................... 709/232 |
| 6,052,730 A | * | 4/2000 | Felciano et al. ............ 709/225 |
| 6,088,731 A | | 7/2000 | Kiraly et al. |
| 6,108,637 A | | 8/2000 | Blumenau |
| 6,115,680 A | | 9/2000 | Coffee et al. |
| 6,119,098 A | | 9/2000 | Guyot et al. |
| 6,134,532 A | | 10/2000 | Lazarus et al. |
| 6,138,155 A | | 10/2000 | Davis et al. |
| 6,141,010 A | | 10/2000 | Hoyle |

(Continued)

FOREIGN PATENT DOCUMENTS

EP    0822535    8/1997

(Continued)

*Primary Examiner*—Thong Vu
*Assistant Examiner*—Hai Van Nguyen
(74) *Attorney, Agent, or Firm*—Ernest J. Beffel, Jr.; Haynes Beffel & Wolfeld LLP

(57) ABSTRACT

A system, method and computer program product are disclosed for presenting information to a user. At a client, information about a user is collected. Via a network, the collected information is transmitted from the client to a location so that a user profile for the user can be generated based on the collected information. Based on the generated user profile, content is selected for the user. At the client, the content is received via the network and then subsequently presented to the user.

45 Claims, 7 Drawing Sheets

U.S. PATENT DOCUMENTS

| | | | |
|---|---|---|---|
| 6,183,366 B1 * | 2/2001 | Goldberg et al. | 463/42 |
| 6,286,043 B1 | 9/2001 | Cuomo et al. | |
| 6,297,819 B1 | 10/2001 | Furst | |
| 6,334,111 B1 * | 12/2001 | Carrott | 705/14 |
| 6,336,131 B1 | 1/2002 | Wolfe | |
| 6,341,305 B2 | 1/2002 | Wolfe | |
| 6,418,440 B1 * | 7/2002 | Kuo et al. | 707/10 |
| 6,418,471 B1 * | 7/2002 | Shelton et al. | 709/227 |
| 6,434,745 B1 | 8/2002 | Conley, Jr. et al. | |
| 6,438,579 B1 * | 8/2002 | Hosken | 709/203 |
| 6,442,529 B1 * | 8/2002 | Krishan et al. | 705/14 |
| 6,446,128 B1 | 9/2002 | Woods et al. | |
| 6,477,575 B1 * | 11/2002 | Koeppel et al. | 709/224 |
| 6,490,722 B1 * | 12/2002 | Barton et al. | 717/174 |
| 6,493,702 B1 * | 12/2002 | Adar et al. | 707/3 |
| 6,539,375 B2 | 3/2003 | Kawasaki | |
| 6,564,202 B1 * | 5/2003 | Schuetze et al. | 707/2 |
| 6,567,850 B1 * | 5/2003 | Freishtat et al. | 709/224 |
| 6,570,595 B2 | 5/2003 | Porter | |
| 6,643,696 B2 | 11/2003 | Davis et al. | |
| 6,681,247 B1 * | 1/2004 | Payton | 709/217 |
| 6,691,106 B1 * | 2/2004 | Sathyanarayan | 707/3 |
| 6,701,362 B1 * | 3/2004 | Subramonian et al. | 709/224 |
| 6,741,967 B1 * | 5/2004 | Wu et al. | 705/10 |
| 6,763,379 B1 * | 7/2004 | Shuster | 709/224 |
| 6,763,386 B2 | 7/2004 | Davis et al. | |
| 6,826,534 B1 * | 11/2004 | Gupta et al. | 705/1 |
| 6,847,969 B1 * | 1/2005 | Mathai et al. | 707/100 |
| 6,853,982 B2 * | 2/2005 | Smith et al. | 705/27 |
| 6,857,024 B1 * | 2/2005 | Chen et al. | 709/231 |
| 6,904,408 B1 * | 6/2005 | McCarthy et al. | 705/2 |
| 7,043,526 B1 | 5/2006 | Wolfe | |
| 7,054,900 B1 * | 5/2006 | Goldston | 709/203 |
| 7,076,546 B1 * | 7/2006 | Bates et al. | 709/224 |
| 2001/0049620 A1 * | 12/2001 | Blasko | 705/10 |
| 2001/0049716 A1 | 12/2001 | Wolfe | |
| 2002/0032592 A1 * | 3/2002 | Krasnick et al. | 705/8 |
| 2002/0038363 A1 * | 3/2002 | MacLean | 709/224 |
| 2002/0052925 A1 * | 5/2002 | Kim et al. | 709/217 |
| 2002/0055912 A1 * | 5/2002 | Buck | 705/76 |
| 2002/0059099 A1 | 5/2002 | Coletta | |
| 2002/0111910 A1 * | 8/2002 | Walsh | 705/51 |
| 2002/0111994 A1 * | 8/2002 | Raghunandan | 709/203 |
| 2002/0112035 A1 * | 8/2002 | Carey et al. | 709/219 |
| 2002/0152121 A1 * | 10/2002 | Hiroshi | 705/14 |
| 2003/0032409 A1 * | 2/2003 | Hutcheson et al. | 455/414 |
| 2003/0120593 A1 * | 6/2003 | Bansal et al. | 705/39 |
| 2004/0098449 A1 * | 5/2004 | Bar-Lavi et al. | 709/202 |
| 2004/0167926 A1 | 8/2004 | Anderson et al. | |
| 2005/0102202 A1 * | 5/2005 | Linden et al. | 705/27 |
| 2005/0149404 A1 * | 7/2005 | Barnett et al. | 705/14 |
| 2006/0015390 A1 * | 1/2006 | Rijsinghani et al. | 705/10 |

FOREIGN PATENT DOCUMENTS

| | | |
|---|---|---|
| WO | WO0054201 | 9/2000 |
| WO | WO 01/03028 | 1/2001 |
| WO | WO 01/15052 | 3/2001 |
| WO | WO 01/39024 | 5/2001 |
| WO | WO0139024 | 5/2001 |
| WO | WO 01/90917 A2 | 11/2001 |

* cited by examiner

SYSTEM, METHOD AND COMPUTER PROGRAM PRODUCT FOR PRESENTING INFORMATION TO A USER UTILIZING HISTORICAL INFORMATION ABOUT THE USER

CROSS REFERENCE TO RELATED APPLICATIONS

This application claims benefit of U.S. Provisional Application No. 60/301,888, entitled "SYSTEM AND METHOD FOR USING CONTINUOUS MESSAGING UNITS IN A NETWORK ARCHITECTURE," filed on Jun. 29, 2001 and which is incorporated by reference herein. U.S. application Ser. No. 10/174,403, entitled "SYSTEM AND METHOD FOR USING CONTINUOUS MESSAGING UNITS IN A NETWORK ARCHITECTURE," filed Jun. 17, 2002 also claims the benefit of U.S. Provisional Application No. 60/301,888. This application also claims benefit of U.S. Provisional Application No. 60/347,921, filed Oct. 18, 2001 by U.S. Postal Service Express Mail Serial No. EL701362699US, entitled 'SYSTEM METHOD AND COMPUTER PROGRAM PRODUCT FOR COLLECTING INFORMATION ABOUT A NETWORK USER" and which is incorporated by reference herein.

FIELD OF THE INVENTION

This invention relates to computer technology, and more particularly, relates to presenting information in a computer network environment.

BACKGROUND OF THE INVENTION

The Internet is a wide area network of interconnected computers which employs a client-server model. The Internet includes server computers which may be accessed by client computers. Typically, a server hosts a site on the Internet which includes a collection of files or pages. The network address of a server is typically specified by a Uniform Resource Language (URL). A user may access the servers from a client via the Internet through an Internet service provider (ISP). By utilizing a browser application on the client, the user can connect to or "link" to a particular server based upon the URL address of that server.

The Internet computer network was originally designed as a communications link to facilitate the exchange of scientific information between governmental laboratories and educational institutions. However, in recent years, the increased use of the World Wide Web (WWW) has fueled explosive growth of the Internet that has extended beyond the scientific community and, indeed, into homes, businesses and classrooms. The WWW refers to a collection of Internet servers that typically utilize Hypertext Transfer Protocol (HTTP) as an applications protocol to provide users with access to files for communicating text, graphics, sound, video, etc. HTTP, in turn, may use a page description language called Hypertext Markup Language (HTML) to specify the format of web pages that are displayed to the users. HTML pages can include hypertext links to other servers and files, with the URL's of the target servers stored or embedded within the links.

Links present in a web page may appear to a user in a variety of forms. For example, a link may appear as underlined text, as bolded text, as text having a different color as surrounding text, or as text having some other form designed to draw the attention of the user such that the link is easily identified as such. When a user selects a link (e.g., by "clicking" on the link with an input device such as a computer mouse), the browser makes a Transmission Control Protocol/Internet Protocol (ICP/IP) request to the server identified by the URL specified in the link, and receives a web page from the identified server. A link may also be embedded within a graphical image displayed on the user's computer monitor or display. When the geographical area of the image is selected by the user, the browser again makes an TCP/IP request to the server identified by the specified URL. Thus, a user may navigate (i.e., "surf") between various servers to find and retrieve HTML pages or documents of interest.

As use of the Internet has become more pervasive, merchants have looked to the Internet as providing a new advertising medium for their products and services. Merchants who sponsor their own web sites typically include advertising material within their site's pages. However, creating and maintaining a stand-alone web site can require a substantial amount of resources and may be beyond the means of many merchants. Also, the time and expense required to set up such a stand-alone site makes this technique unsuitable for certain seasonal, limited time, or one-shot usage. Further, the audience for this advertising material may be limited by the extent to which the merchant can attract users to visit its own site.

A technique that has been used to address these problems is the deployment of advertisements on the web sites of other sponsors or content providers who agree to sponsor the advertisements. A simple advertisement suitable for such deployment takes the form of a graphical banner. Such a banner includes an image related to the product or service being advertised, typically stored as a graphics file (e.g., a ".gif" file), and displayed according to the HTML description of the sponsoring page. A merchant is often required to pay a sponsor of the particular web site an advertising fee for the privilege of deploying its banner on the sponsor's site. The banner may also be widely distributed or deployed on many sites. However, typical advertising banners involve only one-way communication, and do not take advantage of the Internet's interactive capabilities which could otherwise be used to solicit data from prospective customers or users for generating purchase orders or leads.

Some web servers provide a "cookie" to the client's web browser upon the first interaction between the web server and the client's web browser. A cookie may be defined as a unique nugget of information that the web server provides to the web browser. The cookie is typically stored on the hard disk of the client computer and can then be used to share information upon each return visit to the web site. Generally, a cookie includes the address of the server that sent it, and the web browser will only allow the web server that created the cookie to access the cookie. Some browsers do not allow cookies to be stored to the client at all, while other browsers allow the client to disable the storage of cookies.

Cookies can be used to store a variety of information including information about the web pages that a client computer has accessed in a particular visit to a web site. For web sites that require registration, for example, a cookie may hold a user name and password. The web server may use the cookie information to tailor the web site information to the particular requester. The information stored in the cookie, however, only reflects limited information about the requester, such as the web pages accessed during the prior visit, and any information that the requester voluntarily provided during the prior visit. This information may be inaccurate or incomplete. For example, the current requester using the client PC could be different from the original requester who used the client PC on the original or prior visit to the web site.

SUMMARY OF THE INVENTION

A system, method and computer program product are disclosed for presenting information to a user. At a client, information about a user is collected. Via a network, the collected information is transmitted from the client to a location so that a user profile for the user can be generated based on the collected information. Based on the generated user profile, content is selected for the user. At the client, the content is received via the network and then subsequently presented to the user.

In one embodiment, the information about the user may include information relating to network utilization behaviors and attributes of the user. In another embodiment, the user profile may include model-generated information. In a further embodiment, the content may include one or more rules for controlling the presentment of the content to the user at the client.

In an additional embodiment, the information transmitted to the location may include an identifier so that at least a portion of the content is selected based on the identifier. In yet another embodiment, a fee may be generated when the content is selected and the fee charged to a party associated with the selected content. In even another embodiment, the user may access sites coupled to the network utilizing a first application hosted by the client and the content may be presented utilizing a second application hosted by the client.

DETAILED DESCRIPTION

Figure 1:
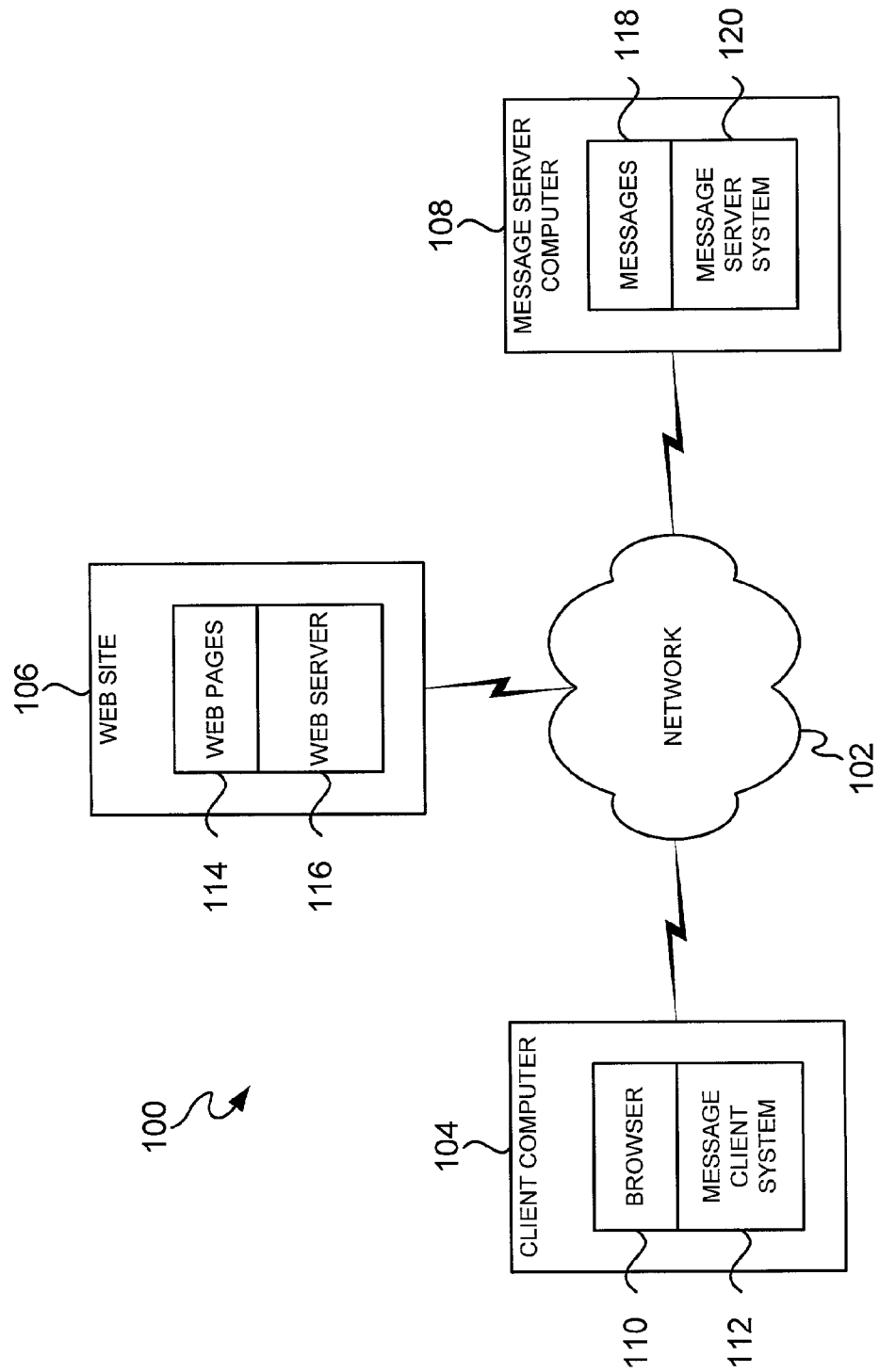
FIG. 1 is a schematic diagram of a computer network framework for a network messaging system in accordance with an embodiment of the present invention.

Because first generation ad networks have a centralized architecture, content (e.g., advertisements) is typically distributed from central servers to a user's browser every time an ad is displayed. Thus, the same ad is distributed from the server several (even millions or billions) of times. The network message system of the present invention allows for more efficiency than such prior art systems. The architecture of the network message system of the present invention may also allow for more flexibility than is possible with server-only ad servers including:

FIG. 1 is a schematic diagram of a computer network framework 100 for a network messaging system in accordance with an embodiment of the present invention. A network 102, such as for example, a client-server network, a wide area network (e.g., the Internet), couples together one or more client computers 104, one or more web sites 106, one or more message server computers 108.

Client computer 104 may be any type of computer that provides an end-user access to a network. In one embodiment, client computer 104 may be a personal computer running on operating system such as for example, the Microsoft Windows™, Apple Macintosh™, Linux, or UNIX operating systems. Client computer 104 may also include a web browser 110 such as the Microsoft Internet Explorer™ or Netscape Navigator™. An end-user utilizing client computer 104 employs web browser 110 for accessing information and web pages stored on various web sites (e.g., web site 106) coupled to the network 102. Client computer 104 may also include a message client system 112 for receiving, processing, and displaying various messages received via the network.

Web site 106 may include one or more web pages 114 and a web server 116. As can be appreciated, such a web site and other server computers in the present disclosure, may be implemented using any appropriately configured computer including, for example server computers available from Sun Microsystems™, the Hewlett-Packard Company™, or International Business Machines™. Web pages 114 may include any information accessible via the network. In one embodiment, web pages 114 may be of the type generally available over the Internet for browsing. For example, a web page of the present invention may include an HTML (HyperText Markup Language) file containing news, maps, coupons, offer for services, directories, for sale merchandize, and other types of information that will attract end-users to the web site 106. The web server 116 may include program code that allows the website to be in communication with the network 102.

The message server computer 108 may be any type of computer capable of sending one or more messages 118 that contain information for presentation/display by the client computer 104. A message may contain any type of information including, for example, advertising information. Message server computer 108 may also include a message server system 120 which is in communication with the network 102.

Figure 2:
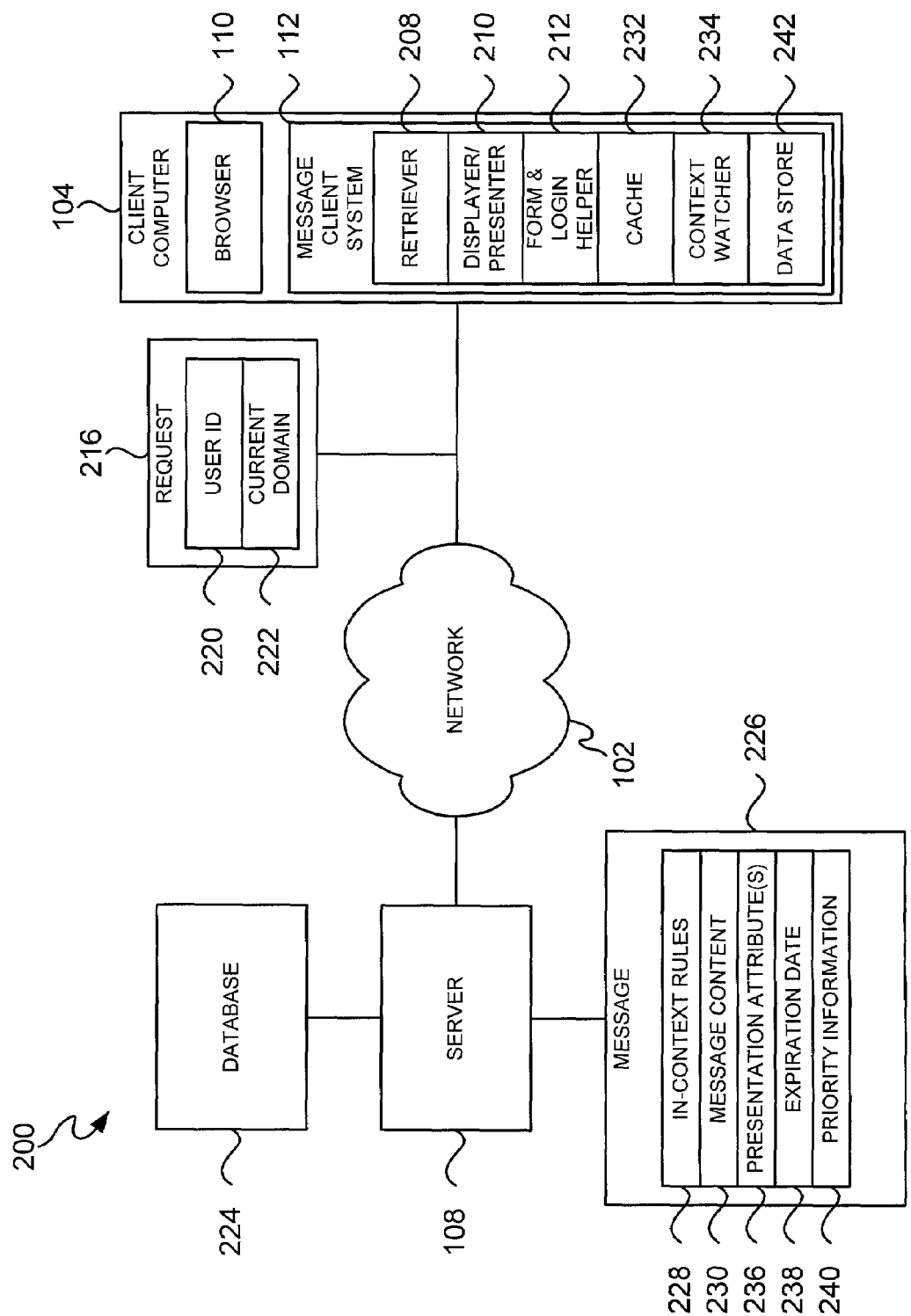
FIG. 2 is a schematic diagram of an illustrative network message system in accordance with an embodiment of the present invention.

FIG. 2 is a schematic diagram of an illustrative network message system 200 utilizing the computer network framework 100 in accordance with an embodiment of the present invention. The network message system may be utilized for retrieving and displaying messages to users based on a user's current context and past behavior. It should be understood that in the present description, the various sub-components of each of the components may also be considered components of the framework. For example, particular software modules executed on any component of the system may also be considered components of the system. Installed and running on a client computer 104 coupled to a network 102 (e.g., the Internet) is a message client application 112. The message client application 112 may comprise a plurality of components including a retriever 208, a displayer 210, a form and login helper 212.

As the user accesses sites coupled to the network 102 (commonly known as "surfing the Internet") utilizing a browser application 110 (e.g., an Internet browser such as Microsoft Internet Explorer) installed and running on the client 104, from one site or domain (e.g., www.yahoo.com) to another (e.g., www.amazon.com), the retriever 208 sends a request 216 to a message system server 108 via the network 102. The request 216 may contain at least two pieces of information: a unique customer ID of the user (i.e., a user ID) 220 and a current domain being entered by the user (e.g., www.yahoo.com) 222. The request may also further contain a machine ID and a current list of messages for the same machine ID. In such an embodiment, the server may then only return new or modified messages back to the client to help save on the use of network bandwidth.

The message system server 108 receives the request 216 from the retriever 208 and performs a check to determine if there are any messages pending for the specified domain 212. If it is determined that there are messages associated with the specified domain, then the message server 108 queries an historical-based targeting database 224 to determined if there are any specific messages pending for this domain 222 for this specific user 220. If there are, then the specific message(s) 226 is returned to the retriever 208 on the user's client machine 104. In one embodiment, this process may be enhanced by the server first returning a list of specific messages and then have the retriever request each individual message from the server.

It should be noted that in one embodiment, that the message(s) 226 may include two components: a block of in-context rules 228 and the content 230 that makes up the portion of the message presented to the user. The in-context rules 228 may dictate the circumstances in which the message content 230 is displayed to the user. Some illustrative examples of some in-context rules include: (1) domains at which the retrieved messages should be presented to the user; (2) specific web pages at which the retrieved messages should be presented to the user; (3) URL substrings that, should they be found in the current URL, will cause the message to be presented; (4) time and date information; and (5) display information (such as, e.g., maximum displays, delay between displays, and days and time of day when to display the message).

Also, the rules 226 may include/reference almost any kind of relevant information, such as, for example, specific known attributes about the user like frequent flyer affiliation, club memberships, type of credit card used, hobbies and interests, basic demographic information (gender, age, income, etc.). The content 230 may also include standard HTML, including text, images, figures, colors, etc., sound files that will automatically play upon display of the message, and other types of multi-media files/content.

Upon receiving the message 226 from the message system server 108, the retriever 208 may store the message in a local cache 232 for subsequent presentation. As the user continues to surf from page to page, a context watcher 234 may examine the user's context (e.g., URL, date/time, etc.) and look for messages stored in the local cache 232 with in-context rules that match. Upon a match being found, the matching message may be presented displayed by either the displayer 210 or the form and login helper 212.

In one embodiment, the message cache 232 may buffer messages received from message system server. This allows the client computer to have several messages at any given time. For example, the message cache may contain a message relating to a current web site or web page the user is visiting and additional messages relating to similar web sites or web pages. As an illustration, the message cache may contain a message relating to books when the end-user is browsing the catalog of an on-line bookstore, and additional messages relating to movies that may also be available from that on-line bookstore. This way, a message relating to movies can be routed to the appropriate presentation format module as soon as the user navigates to a movies-related web page.

In one embodiment, the displayer 210 may open an independent window on a visual display coupled to the user (i.e., the user's screen) that presents/displays the message content 230. As another option, the message content 230 may be presented in a small window that is appended to the form and login helper 212. The specific vehicle to use may be identified as an attribute 236 embedded in the message 226 and selected during creation of the message.

In one embodiment, the displayer may open a slider window that slides up from the bottom right of the screen. The slider window displays for a configurable amount of time and then shrinks to a small bar. The small bar may contain a small description of a coupon. When the user moves a mouse pointer over the small bar, the original slider window may then be displayed again. The small bar may include a close box so the user can selective chose to close the slider window. As a further option, if the small bar is displayed and the user leaves the domain or another coupon can be displayed, the bar is closed.

As an option, the message 226 may include one or more expiration dates 238 that may be used to ensure that a message is not presented after the appropriate time/date. This date 238 may also be monitored by the cache 232 and used to remove expired messages from the client machine. As a further option, the message may also include priority information 240 that may be used when determined the priority of the message over other messages that are to be presented to the user. As yet another option, the message may also include display information (such as, e.g., maximum displays, delay between displays, and days and time of day when to display the message).

In another embodiment, messages 226 may be available on the message system server 108 that are to be presented to any user that satisfies the appropriate context rule 226. Such messages may then be delivered to the client machine 104 by the retriever 208 without requiring matching historical-based profile in the targeting database 224. In one embodiment, the client computer and/or the server may include a data store 242 of user preferences, profile and historical information about the user for use in determining whether a rule has been satisfied.

In an embodiment of the present invention, the network message system may be utilized to deliver various messages/content such as, for example, banner sized and placed Internet advertising technology. The following portions of the specification discuss various components that may be utilized in the network message system in accordance with embodiments of the present invention.

As previously mentioned, a message for the network message system may include two parts or portions: (1) a rules file and (2) content/media for presentation. The rules file may contain the information utilized by the client to determine when and where to display the associated content/media. Some illustrative rule file attributes may include: the type of message; a list of the media and sizes for the particular message; timing information (beginning and ending dates, frequency information, etc.); triggers that indicate where the campaign should be started; and triggers that indicate where the content should be displayed.

The content/media for presentation may comprise Hypertext Markup Language (HTML), image, and/or other types of multi-media files. In one embodiment, the content may also include one or more industry-standard image files representing a display size currently used for banners. However, it should be understood that the content need not be limited to standard image files and may include various types of rich media (Flash, video, audio, etc.).

A message campaign, or flight of messages, may be activated on a client based on the tripping of one of the specified triggers. In other words, the messages may not be presented until one of the specified triggers is hit. In one embodiment, a set of triggers may be defined as a set of Uniform Resource Locators (URL's). The set of URL's may also be combined with search strings. In particular, URL masks may be used for working with search engine queries. For example, there is a standard search URL template for use with the Yahoo search engine. A user may insert a key word of interest (like "Laser" or "Sony" or "DVD") into this template to define a trigger.

A trigger is tripped when the user navigates to a page that maps to one of the trigger rules. As an option, no trigger may need to be tripped in an embodiment of the present invention where historical targeting and/or modeling is utilized to present messages and content to a user(i.e., historical targeting and/or modeling may or may not utilize triggers). In general, a trigger is a condition that, when satisfied, instructs us to take an action (such as, for example, show a message to the user). One type of trigger may be a URL. When the URL of interest is observed, the specified action is taken. When a trigger is tripped, the content for a first message specified in the rule file is retrieved from a message server (as an option, the content can be requested at display time) and the message campaign is activated. One way to look at this activation trigger list is to view it as a mechanism for doing "real time targeting." In other words, users may be selected and targeted for message campaigns based on specific behaviors, without necessarily having had the corresponding behavioral information sent to the message server for processing. This allows fast response to observed behaviors of the user. This approach also may be useful for tightening privacy policy so that detailed behavioral information (including navigation information) does not have to be transmitted via a network to the message server. Once the media to be presented has been retrieved, the client may begin to determine when to present the message.

In one embodiment, a client may present a message when at least one of the following criteria has been met: (1) when the message campaign has been activated (as described above); (2) when the client detects an HTML image, Flash, form or other web control (which may also be referred to as the original image/form) request for an image with a size matching that of the message client system; (3) the server's domain name from which the original image is being requested is not included in an exclude list of the message server system; (4) the domain of the current web page is included either in a specified global domain inclusion list or on a private domain inclusion list of the message; and/or (5) the domain of the current web page is not on a private domain exclusion list of the message. The message can also match on the URL of the page, with substrings (as mentioned earlier), or can be exclude based on URL matching on the image URL (where the image is actually served from and which can be different than the web page URL).

Figure 3:
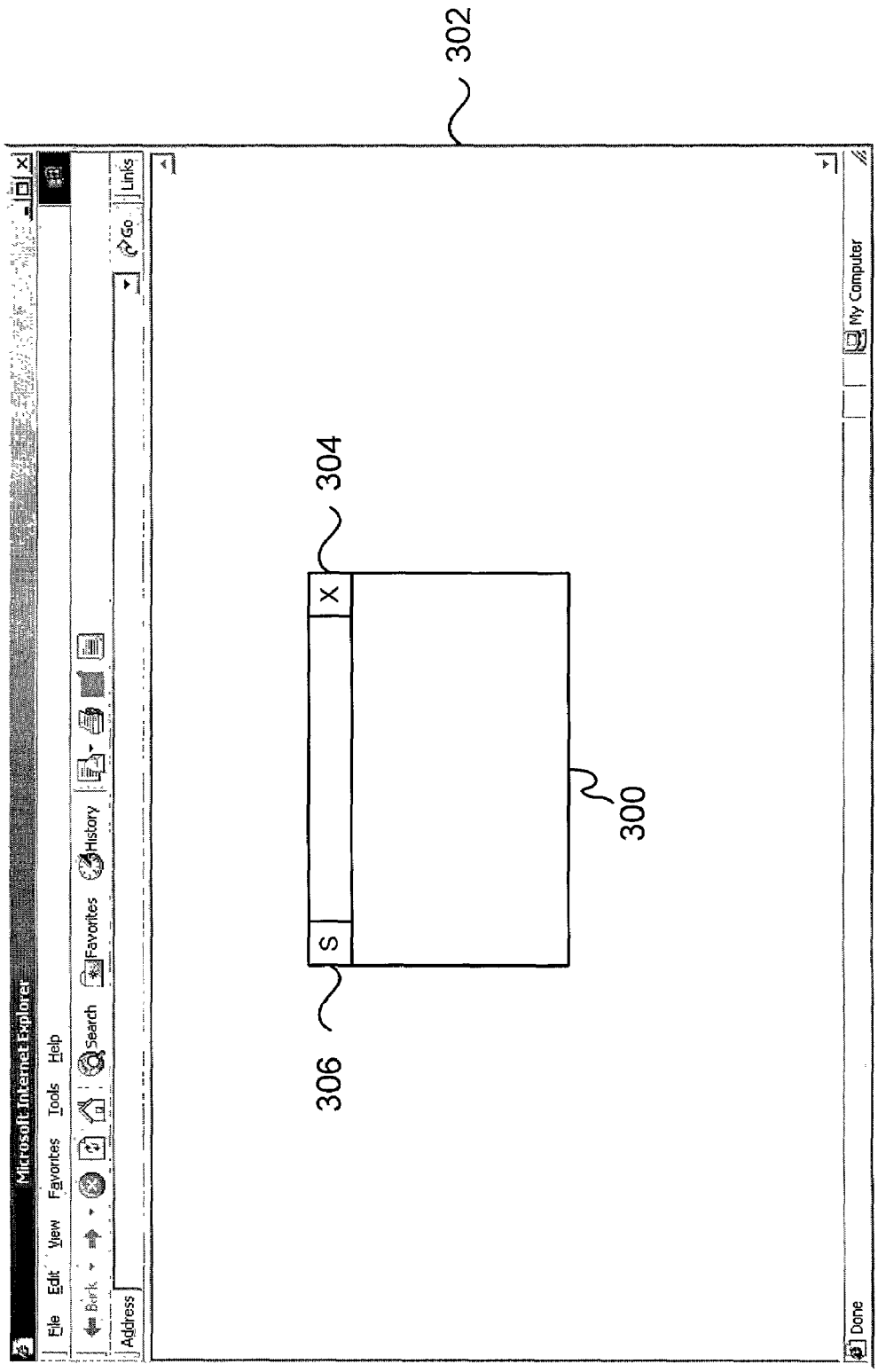
FIG. 3 is a schematic representation of an illustrative display presented on a visual display in accordance with an embodiment of the present invention.

FIG. 3 is a schematic representation of an illustrative display 300 presented on a visual display by the displayer 210 on a user's client computer 104. In one embodiment, the client may present the message in an overlapping window (or frame) such as, for example, a pop-up window 300, that is created by the client for that purpose. In a preferred embodiment, this frame is displayed by an application (i.e., the message client system) running on the client separate from a browser application 302 (e.g., Microsoft's Internet Explorer) running on the client. In an embodiment of the present invention, the message window may included one or more of the following attributes: (1) the message window may be re-positionable by the user (e.g., the user may be able to move the message window around within a client area of the browser by drag and drop techniques); (2) the message window may have a close box or button 304 (e.g., such as the type positioned in the upper right hand corner of a Microsoft Windows application window) for selectably closing the message window which may be positioned in the upper right corner; (3) the message window may also include access controls for presenting information about the message, message client system, and/or related user preferences to the user (e.g., such as the "?" button displayed in a Microsoft Windows application window); (4) branding information; (5) tracking the position of the message window relative to the origin of the client area of the browser window so that the message window can maintain its relative position as the user scrolls, resizes or moves the browser window; (6) a save control feature 306 that allows a user to save a presented message for future reference; and/or (7) features for forwarding the message via the network and printing image portion(s) of the message.

As an option, one or more preferences may be available to the user for customizing the behavior of messages presented on their particular client. As an illustrative example, the user may be permitted to set preferences related to the position at which the message window is displayed and the delay (if any) between the completion of the loading of the web page and the display of the message. As a further option, the delay time may also be used to rotate the user through multiple message per page displayed on the browser application if the user spends sufficient or long enough time at those pages displayed on the browser application.

For illustrative purposes, the following examples are provided merely to illustrate an illustrative positioning preference feature such the type as described above: the message window position can be configured by the user to be displayed at an upper right corner of the browser window or directly over the browser window or at a center region of the visual display of the client computer. For illustrative purposes, the following examples are provided merely to illustrate such a positioning preference features as described above: For illustrative purposes, the following examples are provided merely to illustrate an illustrative presentation delay preference feature such the type as described above: display of the message in the message window immediately after a web page has been completed loaded by the browser application, 1.5 seconds after the web page has been completely loaded by the browser application, and/or a user specified number of seconds after the web page has been loaded.

As new messaging campaigns are entered into the network message system, they are queued up for publishing. The message campaigns in the queue are then processed as follows. First, the domains of the URL triggers in each message are extracted and a domain list is compiled from the extracted domains. Next, the resulting domain list is used to update a client hash table. This trigger information is then sent to the message system server and used by the message system server to respond to client requests for messages. The triggers and rules may be generated at this point and stored in the message file. The server reads the same message file that the client downloads. The server then decides which message the client gets based on information in the message file. The rule file information is then extracted and sent to the message server system and message content is retrieved from the message system server. This process is repeated until the publishing queue is cleared of pending message/ message campaigns.

Published campaigns are distributed to client machines via the message system server. The message system server may also distribute the following information throughout the network message system: (1) client hash table; (2) rule file lists; (3) rule files; and message related content. In one embodiment, the hash table may be updated each time the publishing process is performed (e.g., if no new message/ domain combinations are added and none are taken away then the hash table can remain unchanged). This file may contain exclusion lists that the client uses to override display on sites. Each rule contains an AIC (a tag of which partner the client was downloaded from) and advertiser, a domain name and a list of message types to exclude.

A list of rule files are transmitted via the network to the client by the server in response to a request by the client. Client requests may be made by the client machine's user as the user navigates into various domains via the browser application. As part of the request, the server may be provided information such as, for example, the user's current domain and a list of rule files (for the current domain) already residing on the client machine.

Next, the server then finds messages that can be used at the current domain. The GRF file names for each message are added to the GRF file list. Each list entry also contains an action code that indicates an action the client should take for that entry. These actions may include, for example: (1) Add—add the specified message to the client's local cache; (2) Delete—remove the specified message from the client's local cache; and (3) Update—update the specified message in the client's cache. Rule files and message related content typically may be delivered to the client using standard web-serving technology.

Figure 4:
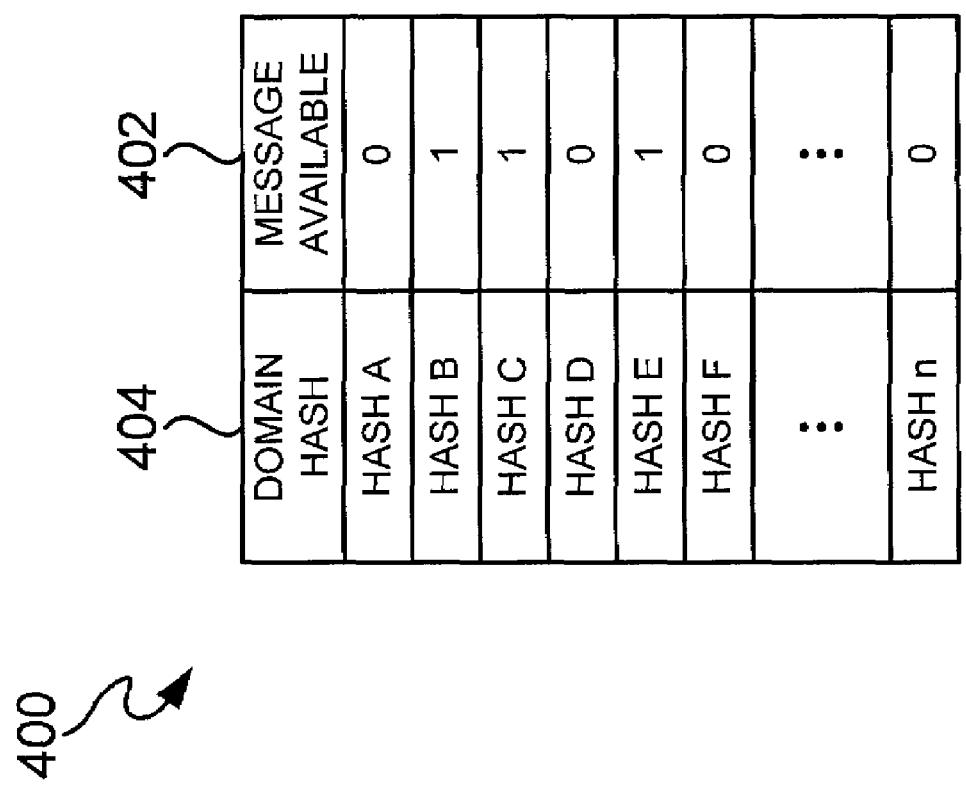
FIG. 4 is a schematic diagram of an illustrative hash table in accordance with an embodiment of the present invention.

FIG. 4 is a schematic diagram of an illustrative hash table 400 in accordance with an embodiment of the present invention. A client initiates requests for messages as the user enters Internet domains utilizing an Internet browser running on the client. In one embodiment, minimization of unproductive server requests may be accomplished through the use of the client hash table 400. In such an embodiment, the hash table may provide the information needed for the client to determine whether or not messages are available 402 for use at a given domain 404. In other words, the client may first look up a domain in the hash table before transmitting a request to the server via the network. In one embodiment, server requests may be made for those domains that have an entry in the hash table. Also, each client may also periodically check (i.e., transmit a server request) for an updated version of the hash table.

Once the client has established that there are messages available for the current domain, the client may then make a request to the server for the available message units. Information included in this request may includes: (1) a machine ID identifying the client machine; (2) a user ID identifying the user; (3) the local time; (4) a domain for which the messages are being requested; and (5) a list of the locally cached messages previously retrieved for this domain—each entry in this list may also include the message ID and version number.

In response to the server request, the client receives a list of rule files to retrieve from the rule file store of the message server system. The client may then retrieve each of those files in the list.

Once a rule file has been retrieved from the server, the client may then make a request to retrieve the content for the first image in the content list (or when triggered or when displayed). As an option, when retrieving large content files such as, for example, certain types of rich media, the content may be transmitted to the client via a trickling process that consumes relatively little ongoing bandwidth.

As the user navigates to each web page utilizing an Internet browser, the client may take the current URL and look for trigger matches in the list of locally cached rule files. When a match is found, the client may then present the previously fetched content. In one embodiment, if more than one match is found, then the message with the highest priority may be chosen. After presenting the message content, the client may check to see if there are other content/images associated with the current message's rule file. If so, the next image in the list may then be retrieved and cached locally. This content/image may then be presented when the next qualifying trigger situation is observed.

Figure 5:
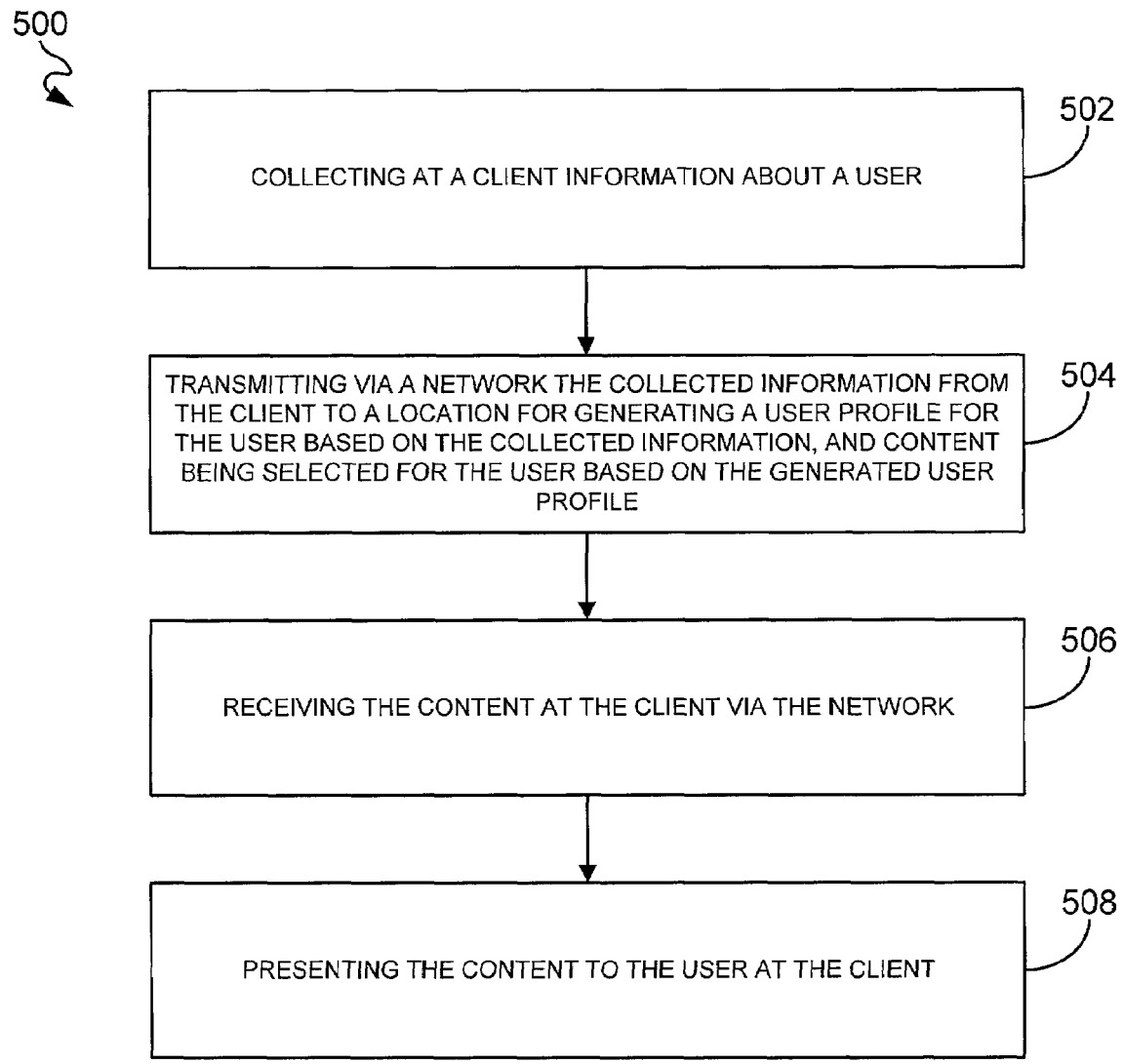
FIG. 5 is a flowchart of a process for presenting information to a user in accordance with an embodiment of the present invention.

FIG. 5 is a flowchart of a process 500 for presenting information to a user in accordance with an embodiment of the present invention. At a client, information about a user is collected in operation 502. Via a network, the collected information is transmitted from the client to a location (e.g., a server) in operation 504 so that a user profile for the user can be generated based on the collected information. Based on the generated user profile, content is selected for the user. At the client, the content is received via the network where the content is subsequently presented to the user (see operations 506 and 508).

In one embodiment, the information about the user may include information relating to network utilization behaviors and attributes of the user. In another embodiment, the user profile may include computer model-generated information associated with the user based on information collected from the user and/or similar other users. In a further embodiment, the content may include one or more rules for controlling the presentment of the content to the user at the client. For example, the rules may provide instructions to the client as to when to present the content and the order and/or priority by which the content should be presented to the user.

In an additional embodiment, the information transmitted to the location may include an identifier identifying, for example, the user (e.g., a user ID) and/or the client machine (e.g., a machine ID) so that at least a portion of the content is selected based on the identifier. In yet another embodiment, a fee may be generated when the content is selected with the fee being charged to a party associated with the selected content. As an option in such an embodiment, the fee charged for the selected content based on the user profile may be priced greater than the fee charged for content that is not selected based on the user profile. In even another embodiment, the user may access sites coupled to the network utilizing a first application hosted by the client (such as, for example, an Internet browser) with visual information provided by those sites being presented in a first display frame/window. In such an embodiment, the content may be presented utilizing a second application hosted by the client (such as, for example, a content message unit) with visual portions of the content being present ed in a second display frame.

While most message may be made available to the entire audience (i.e., users) utilizing the network message system, as a further option, individual users may be targeted to receive messages based on their particular historical profile. Historical-based targeting may be used to select users based on behaviors and/or attributes such as, for example: (1) navigation behavior such as, for example, domains visited, number of pages viewed, time spent at sites, and the viewing of any previously tagged page; (2) ZIP code information; (3) click-through frequency on previously viewed messages; (4) affiliate identification code or type co-branding; (5) number of weeks for the user has been active utilizing the network message system; and (6) modeled behavior based on information collected regarding what other similar users have behaved online. With regard to previously tagged pages, triggers may be set for pages that a party may want to track without the user seeing any activity. For example, suppose a party wants to know how many people purchase items at a particular Internet store (e.g., Amazon.com). A blind trigger may be set to observe navigations to the receipt page. A reporting system of the network message system could then tally up the number of times over a period of time for which the blind trigger is set while the user would not encounter any feedback that this tallying is occurring. As with other messages, targeted messages may be made available to the client machines in response to client message requests. In such a situation, the message server may take the machine and/or user ID provided as part of the client request and then perform a query inside the network message system to determine if there are any messages pending for that particular user (or that match that user's particular profile).

Figure 6:
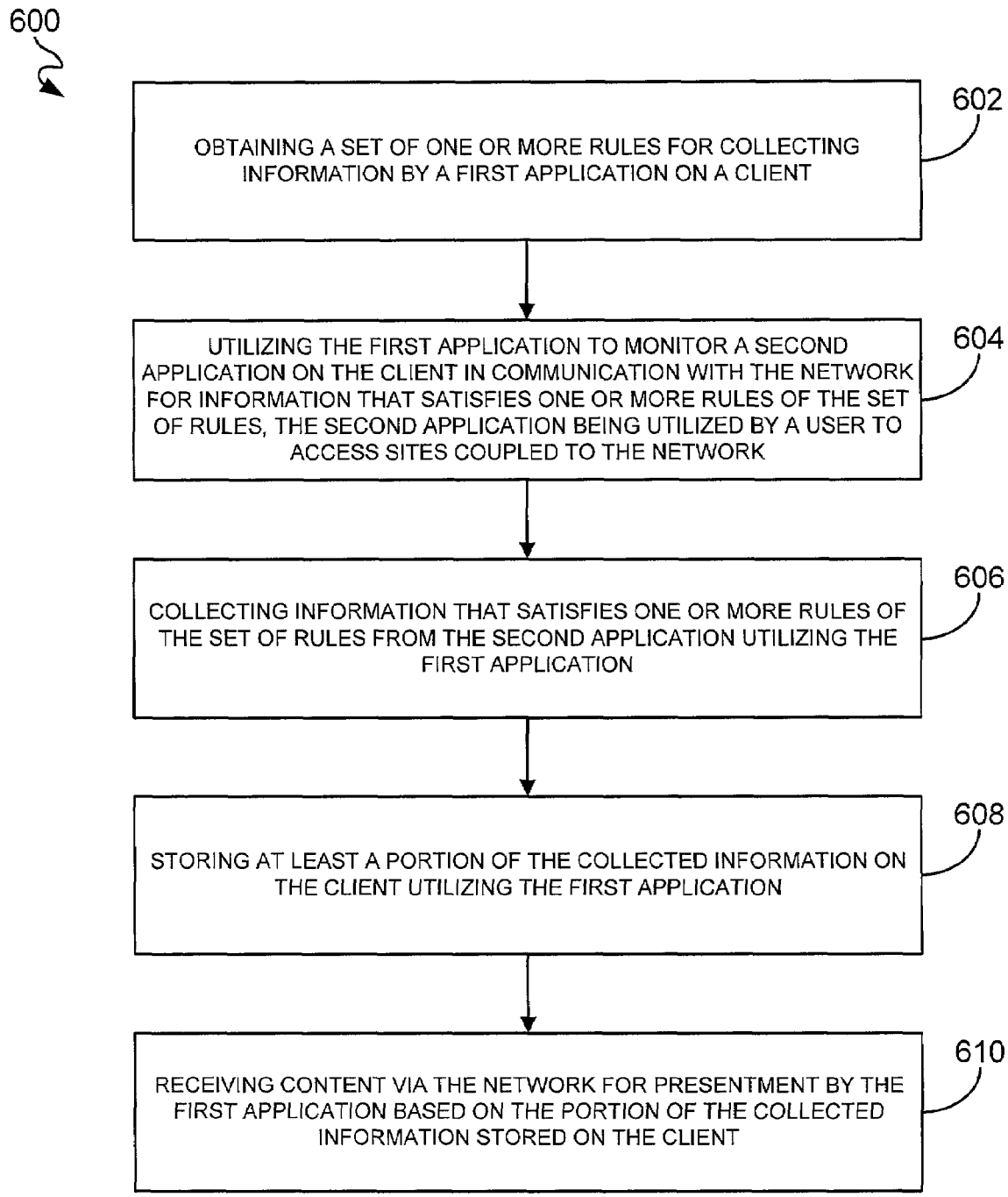
FIG. 6 is a flowchart of a process for collecting information about a user in accordance with an embodiment of the present invention.

FIG. 6 is a flowchart of a process 600 for collecting information about a user in accordance with an embodiment of the present invention. In operation 602, a set of one or more rules for collecting information is obtained by a first application (e.g., a message client system) on a client. The first application is utilized in operation 604 to monitor a second application on the client in communication with the network for information that satisfies one or more rules of the set of rules. The second application is utilized by a user to access sites coupled to the network (e.g., an Internet browser). In use, the second application may receive and transmit information/communications between the user and the sites and/or the network.

Information that that satisfies one or more rules of the set of rules is collected from the second application utilizing the first application in operation 606. At least a portion of the collected information is stored on the client utilizing the first application in operation 608. Content is received at the client via the network for presentment to the user by the first application based on the portion of the collected information stored on the client in operation 610.

In one embodiment, the collected information may include behavioral information about the user such as, for example, network utilization behaviors and attributes of the user. In another embodiment, the set of one or more rules may be updated based on the collected information. In a further embodiment, at least one of the rules may include a trigger can be tripped by the collected information so that a notification may be transmitted to a location via the network.

In an additional embodiment, the set of one or more rules may be obtained utilizing the network. In yet another embodiment, the content may includes one or more additional rules for controlling the presentment of the content. In even another embodiment, at least a portion of the collected information may be transmitted to a location (e.g., a server) utilizing the network. As an option in such an embodiment, the information transmitted to the location may include an identifier so that at least a portion of the content received by the client is based on the transmitted identifier. In another embodiment, the rules may be executed by a server computer based on profiles stored server-side or by the user's client computer based on profiles stored client-side.

Profile information about the user's behavior across nearly all web pages displayed by web sites may be collected without requiring any user involvement. While an Internet service provider (ISP) can elect to keep track of some or all of the web pages a user visits, the ISP cannot access or "see" the content of any web pages that are transmitted to the user's browser in a "secure" mode (e.g. when the web site elects to use encryption such as SSL or the like so that the web page's contents are encrypted during transmission). Because portions of the embodiments of the present invention are executed on the user's computer, the network message system may interface to the user's Internet browser in such a way that it can see all of the web pages.

Profiles, to the extent that prior art systems utilize profiles, are typically stored on the server only. In contrast, embodiments of the present invention permit storing of a portion of the profile information about the user on the client side. Such a feature may be useful in helping to meet information privacy rules and standards while still being able to target information to users based on private information. For example, suppose a provider of content wanted to do some targeting for a credit card firm based upon what kind of credit card a user/consumer has. Storing that credit card number on the message server may violate a privacy policy of the provider. But this information could still be used to deliver targeted offers by just causing the rules associated with that particular content campaign to be executed on the user's computer rather than on the message system server. Another benefit of storing at least a portion of a consumer's profile on the client side may be to improve performance of the targeting by reducing time-consuming and bandwidth consuming traffic between the client and server.

Embodiments of the present invention may be capable of delivering rich media advertising by trickling technology to pre-fetch the media, downloading it to the desktop prior to its display in a way that doesn't appreciably slow down the user's web browsing. This allows the consumer to see rich media comprised of larger files without waiting for them to download as part of a web page. Unlike the prior art, embodiments of the present invention may intelligently figure out which media to pre-fetch using a passive profiling technique without requiring any user involvement to state his preferences. In contrast, most prior art "push" applications require users to actively "subscribe" to different content channels, or otherwise state their preferences.

The intelligence or rules about what advertising messages to display to what user, and when to display it, may also be distributed utilizing the network message system of the present invention. One major challenge that embodiments of the network message system overcome is the following dilemma: in order to get the best performance for behavioral targeting, (i.e., to be able to quickly make decisions), it may be desirable to evaluate the rules on the client side. But this requires that the database of rules be stored on the client. As the number of advertising campaigns grows, the aggregate rule set can become quite large. This aggregate rule set may potentially be too large to store on the client side (for example, it would consume too much storage space of the client) while keeping it up-to-date may require a lot of traffic between the client and server, potentially slowing down the user's browsing experience and consuming a lot of costly network bandwidth. In embodiments of the present invention, a hash table may be utilized to allow "just in time" downloading of a subset of the rules: just those rules for the sites that the user actually visits. This small hash table may allow one to predict whether or not it may be appropriate to display an advertisement as a result of a user's activity at a given web site without having to download the entire rules database to the client. It should be noted that not only can the advertising media itself be downloaded on a just-in-time basis, but that the rules themselves may also be downloaded on a just in time basis in a way that's custom-tailored for each user based upon the web sites he visits.

Embodiments of the present invention may also synchronize the presentation/display of messages with the display of information on a web page.

Passive profiling capabilities of the present invention may be utilized to determine which of a set of new software applications are potentially of interest to a user of the network message system. When it is determined that a particular application may be of interest to a user, a copy of the software may be pre-fetched and then offered to the user.

Figure 7:
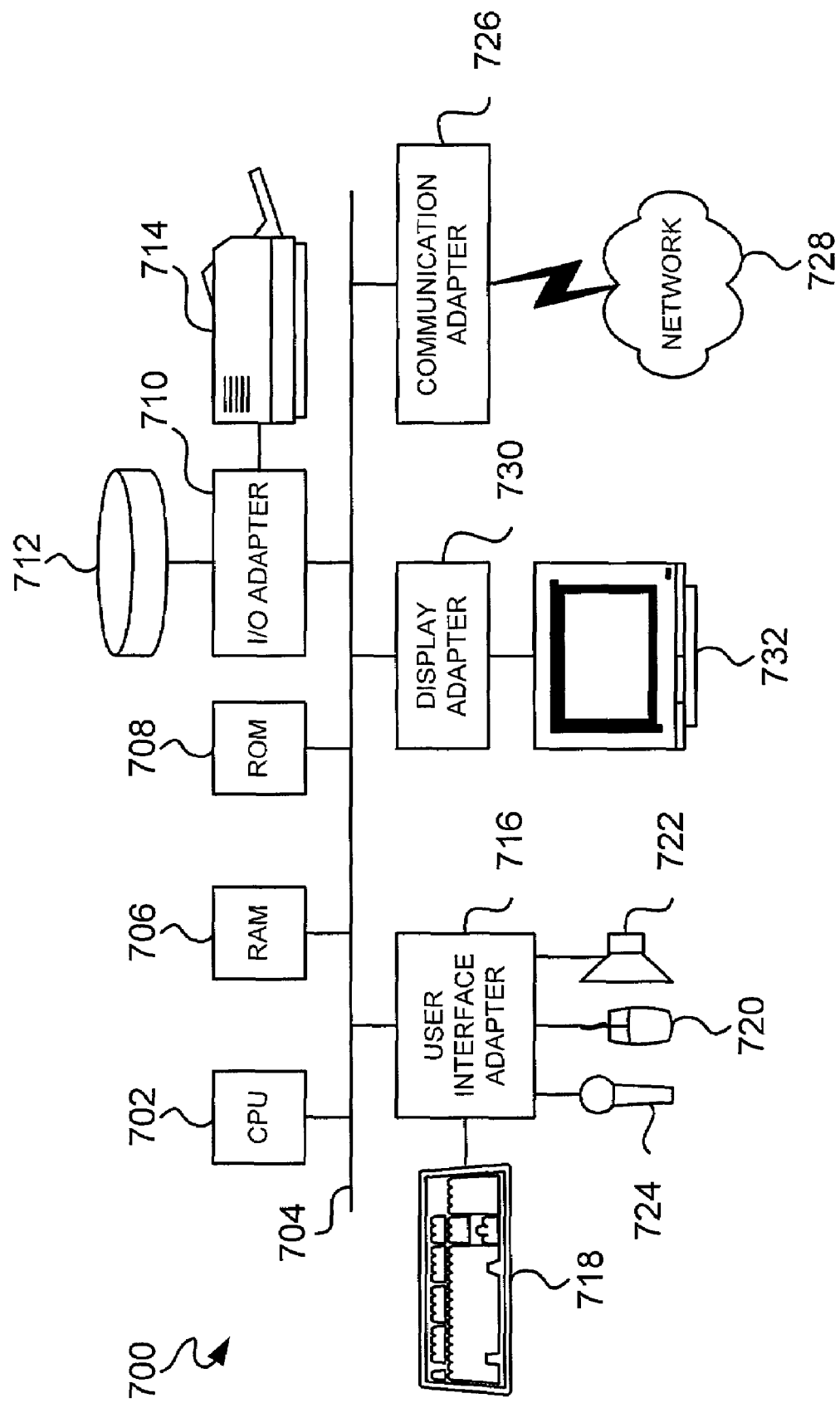
FIG. 7 is a schematic diagram of a representative hardware environment in accordance with an embodiment of the present invention.

FIG. 7 is a schematic representation of an illustrative hardware configuration of a representative computer 700 that may be utilized for carrying out embodiments of the present invention. Computer 700 (such as, for example, an IBM compatible personal computer, Apple Macintosh computer or UNIX based workstation) has a central processing unit 702, such as a microprocessor, and a number of other units interconnected via a system bus 704. The computer 700 also includes a Random Access Memory (RAM) 706, Read Only Memory (ROM) 708, an I/O adapter 710 for connecting peripheral devices such as, for example, disk storage units 712 and printers 714 to the bus 704, a user interface adapter 716 for connecting various user interface devices such as, for example, a keyboard 718, a mouse 720, a speaker 722, a microphone 724, and/or other user interface devices such as a touch screen or a digital camera to the bus 704, a communication adapter 726 for connecting the computer 700 to a communication network 728 (e.g., a data processing network) and a display adapter 730 for connecting the bus 704 to a display device 732.

The computer 700 typically has resident thereon an operating system such as Microsoft Windows Operating System (OS), the IBM OS/2 operating system, the MAC OS, or UNIX operating system. Those skilled in the art will appreciate that embodiments present invention may also be implemented on platforms and operating systems other than those mentioned. An embodiment of the present invention may be written using traditional methodologies and programming languages, such as C, Pascal, BASIC or Fortran, or may be written using object oriented methodologies and object-oriented programming languages, such as Java, C++, C#, Python or Smalltalk. Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution." Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Transmission Control Protocol/Internet Protocol (TCP/IP) is a basic communication language or protocol of the Internet. It can also be used as a communications protocol in the private networks called intranet and in extranet. When you are set up with direct access to the Internet, your computer is provided with a copy of the TCP/IP program just as every other computer that you may send messages to or get information from also has a copy of TCP/IP. TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination. TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received.).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite." Personal computer users usually get to the Internet through the Serial Line Internet Protocol (SLIP) or the Point-to-Point Protocol. These protocols encapsulate the IP packets so that they can be sent over a dialup phone connection to an access provider's modem. Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP). Internetwork Packet Exchange (IPX)is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Encryption is the conversion of data into a form, called a ciphertext, that cannot be easily understood by unauthorized people. Decryption is the process of converting encrypted data back into its original form, so it can be understood. The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII. Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals. In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security. The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if I send you a message, I can find out your public key (but not your private key) from a central administrator and encrypt a message to you using your public key. When you receive it, you decrypt it with your private key. In addition to encrypting messages (which ensures privacy), you can authenticate yourself to me (so I know that it is really you who sent the message) by using your private key to encrypt a digital certificate. When I receive it, I can use your public key to decrypt it.

A Uniform Resource Locator (URL) is the address of a file (resource) accessible on the Internet. The type of resource depends on the Internet application protocol. Using the World Wide Web's protocol, the Hypertext Transfer Protocol, the resource can be an HTML page, an image file, a program such as a common gateway interface application or Java applet, or any other file supported by HTTP. The URL contains the name of the protocol required to access the resource, a domain name that identifies a specific computer on the Internet, and a hierarchical description of a file location on the computer.

On the Web (which uses the Hypertext Transfer Protocol), an example of a URL is: http://www.mhrcc.org/kingston which describes a Web page to be accessed with an HTTP (Web browser) application that is located on a computer named www.mhrcc.org. The specific file is in the directory named/kingston and is the default page in that directory (which, on this computer, happens to be named index.html). An HTTP URL can be for any Web page, not just a home page, or any individual file.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer subsystem embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for presenting information, comprising:
   collecting, at a client, information about a user utilizing a local application persistently residing on the client and executing independently of a client web engine, the information about the user including navigation behavior of the user across multiple websites, the navigation behavior being monitored at the client by the local application;
   transmitting via a network the collected information from the local application on the client to a location for generating a user profile for the user based on the collected information, wherein content is selected for the user based on the generated user profile;
   receiving the content at the client via the network; and
   presenting the content to the user at the client.

2. The method of claim 1, wherein the information about the user includes information relating to network utilization behaviors and attributes of the user, and wherein the navigation behavior includes information of domains visited by the user, number of pages viewed by the user and time spent by the user at a site.

3. The method of claim 1, wherein the user profile of the user includes model-generated information.

4. The method of claim 1, wherein the content includes one or more rules for controlling the presentment of the content to the user at the client.

5. The method of claim 1, wherein the information transmitted to the location includes an identifier, and wherein at least a portion of the content is selected based on the identifier.

6. The method of claim 1, wherein a fee is generated when the content is selected, and wherein the fee is charged to a party associated with the selected content.

7. The method of claim 1, wherein the user accesses sites coupled to the network utilizing a browser application hosted by the client computer and monitored by the local application.

8. A system for presenting information, comprising:
   a network;
   a client coupled to the network;
   a local application on the client, the local application, persistently residing thereon and executing independently of a client web engine, being adapted for collecting at the client information about a user of the client, the information about the user including navigation behavior of the user across multiple websites, the navigation behavior being monitored at the client by the local application;
   the local application being adapted for transmitting, via the network, the collected information at the client to a remote location coupled to the network;
   the location being adapted for generating a user profile for the user based on the collected information and selecting content for the user based on the generated user profile; and
   the local application being adapted for receiving, via the network, the selected content from the location and presenting the content to the user at the client.

9. The system of claim 8, wherein the information about the user includes information relating to network utilization behaviors and attributes of the user, and
   wherein the navigation behavior includes information of domains visited by the user, number of pages viewed by the user and time spent by the user at a site.

10. The system of claim 8, wherein the user profile of the user includes model-generated information.

11. The system of claim 8, wherein the content includes one or more rules for controlling the presentment of the content to the user by the local application.

12. The system of claim 8, wherein the information transmitted to the location includes an identifier, and wherein at least a portion of the content is selected based on the identifier.

13. The system of claim 8, wherein a fee is generated when the content is selected, and wherein the fee is charged to a party associated with the selected content.

14. The system of claim 8, wherein the user accesses sites coupled to the network utilizing a browser application hosted by the client and monitored by the local application.

15. A computer program product embodied on a computer readable medium for presenting information, comprising:
    computer code that collects at a client information about a user utilizing an application persistently residing on the client and executing independently of a client web engine, the information about the user including navigation behavior of the user across multiple websites, the navigation behavior being monitored at the client by the application;
    computer code that transmits via a network the collected information from the application on the client to a location for generating a user profile for the user based on the collected information, wherein content is selected for the user based on the generated user profile;
    computer code that receives the content at the client via the network; and
    computer code that presents the content to the user at the client.

16. The computer program product of claim 15, wherein the information about the user includes information relating to network utilization behaviors and attributes of the user, and wherein the navigation behavior includes information of domains visited by the user, number of pages viewed by the user and time spent by the user at a site.

17. The computer program product of claim 15, wherein the user profile of the user includes model-generated information.

18. The computer program product of claim 15, wherein the content includes one or more rules for controlling the presentment of the content to the user at the client.

19. The computer program product of claim 15, wherein the information transmitted to the location includes an identifier, and wherein at least a portion of the content is selected based on the identifier.

20. The computer program product of claim 15, wherein a fee is generated when the content is selected, and wherein the fee is charged to a party associated with the selected content.

21. The computer program product of claim 15, wherein the user accesses sites coupled to the network utilizing a browser application hosted by the client and monitored by the application.

22. A system for presenting information, comprising:
    means for collecting information about a user at a client utilizing an application persistently residing on the client and executing independently of a client web engine, the information about the user including navigation behavior of the user across multiple websites, the navigation behavior being monitored at the client by the application;
    means for transmitting via a network the collected information from the application on the client to a location for generating a user profile for the user based on the collected information, wherein content is selected for the user based on the generated user profile;
    means for receiving the content at the client via the network; and
    means for presenting the content to the user at the client.

23. A method for presenting information, comprising:
    receiving via a network, information about a user collected by an application persistently residing on the client and executing independently of a client web engine, the information about the user including information about a navigation behavior of the user across multiple websites, the information about the navigation behavior being monitored at the client by the application;
    generating a user profile for the user based on the information;
    selecting content for presenting the user based on the user profile; and
    transmitting the content to the client via the network, wherein the content is presented to the user by application on the client.

24. The method of claim 23, wherein the information about the user includes information relating to network utilization behaviors and attributes of the user, and
    wherein the navigation behavior includes information of domains visited by the user, number of pages viewed by the user and time spent by the user at a site.

25. The method of claim 23, wherein the userprofile of the user includes model-generated information.

26. The method of claim 23, wherein the content includes one or more rules for controlling the presentment of the content to the user at the client.

27. The method of claim 23, wherein the information transmitted to the location includes an identifier, and wherein at least a portion of the content is selected based on the identifier.

28. The method of claim 23, wherein a fee is generated when the content is elected, and wherein the fee is charged to a party associated with the selected content.

29. The method of claim 23, wherein the user accesses sites coupled to the network utilizing a browser application hosted by the client.

30. A system for presenting information, comprising:
    a server coupled to a network and being adapted for receiving utilizing a network information about a user collected by an application persistently residing on a client and executing independently of a client web engine, the information about the user including information about a navigation behavior of the user across multiple websites, the information about the navigation behavior being monitored at the client by the application;
    the server being adapted for generating a user profile for the user based on the information collected by the application;
    selecting content for presenting the user based on the user profile; and
    transmitting the content to the client via the network, wherein the content is presented to the user by the application on the client.

31. The system of claim 30, wherein the information about the user includes information relating to network utilization behaviors and attributes of the user, and wherein the navigation behavior includes information of domains visited by the user, number of pages viewed by the user and time spent by the user at a site.

32. The system of claim 30, wherein the user profile of the user includes model-generated information.

33. The system of claim 30, wherein the content includes one or more rules for controlling the presentment of the content to the user at the client.

34. The system of claim 30, wherein the information transmitted to the location includes an identifier, and wherein at least a portion of the content is selected based on the identifier.

35. The system of claim 30, wherein a fee is generated when the content is selected, and wherein the fee is charged to a party associated with the selected content.

36. The system of claim 30, wherein the user accesses sites coupled to the network utilizing a browser application hosted by the client.

37. A computer program product embodied on a computer readable medium for presenting information, comprising:
   computer code that receives utilizing a network information about a user collected by an application persistently residing on a client and executing independently of a web client engine, the information about the user including information about a navigation behavior of the user across multiple websites, the information about the navigation behavior being monitored at the client;
   computer code that generates a user profile for the user based on the information;
   computer code that selects content for presenting the user based on the user profile; and
   computer code that transmits the content to the client via the network, wherein the client presents the content to the user.

38. The computer program product of claim 37, wherein the information about the user includes information relating to network utilization behaviors and attributes of the user, and wherein the navigation behavior includes information of domains visited by the user, number of pages viewed by the user and time spent by the user at a site.

39. The computer program product of claim 37, wherein the user profile of the user includes model-generated information.

40. The computer program product of claim 37, wherein the content includes one or more rules for controlling the presentment of the content to the user at the client.

41. The computer program product of claim 37, wherein the information transmitted to the location includes an identifier, and wherein at least a portion of the content is selected based on the identifier.

42. The computer program product of claim 37, wherein a fee is generated when the content is selected, and wherein the fee is charged to a party associated with the selected content.

43. The computer program product of claim 37, wherein the user accesses sites coupled to the network utilizing a first application hosted by the client, and wherein the content is displayed utilizing a second application hosted by the client.

44. A system for presenting information, comprising:
   Means for receiving utilizing a network information about a user collected at a client; by an application persistently residing on the client and executing independently of a client web engine, the information about the user including information about a navigation behavior of the user across multiple websites, the information about the navigation behavior being monitored at the client by the application;
   means for generating a user profile for the user based on the information;
   means for selecting content for presenting the user based on the user profile; and
   means for transmitting the content to the client via the network, wherein the content is presented to the user by the application on the client.

45. A method, comprising:
   utilizing a message client system persistently residing on a client computer and executing independently of a client web engine to monitor use of a browser application on the client computer by a user to collect information, at the client computer, about a navigation behavior of the user across multiple websites;
   transmitting the collected information from the client computer to a remote location via a network, the location generating a profile of the user based on the collected information received from the client computer, selecting content for the user, and providing the selected content to the message client system via the network, the content further including a rule for initiating the presentment of the content to the user based on subsequent use of the browser application by the user; and
   presenting the content to the user using the message client system if the message client system determines that the use of the browser application by the user satisfies the rule.

* * * * *